R. TYRRELL.
Bending Tires.
No. 79,089.
Patented June 23, 1868.
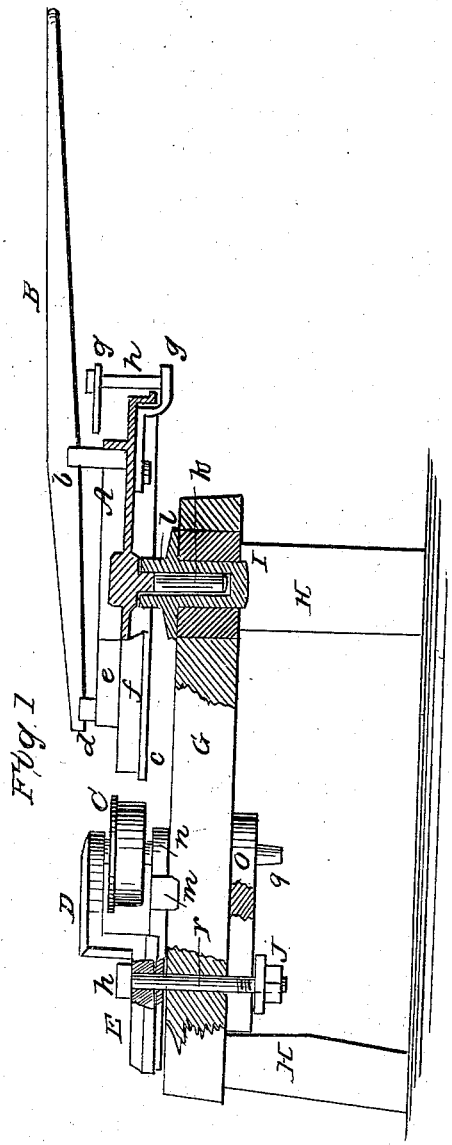
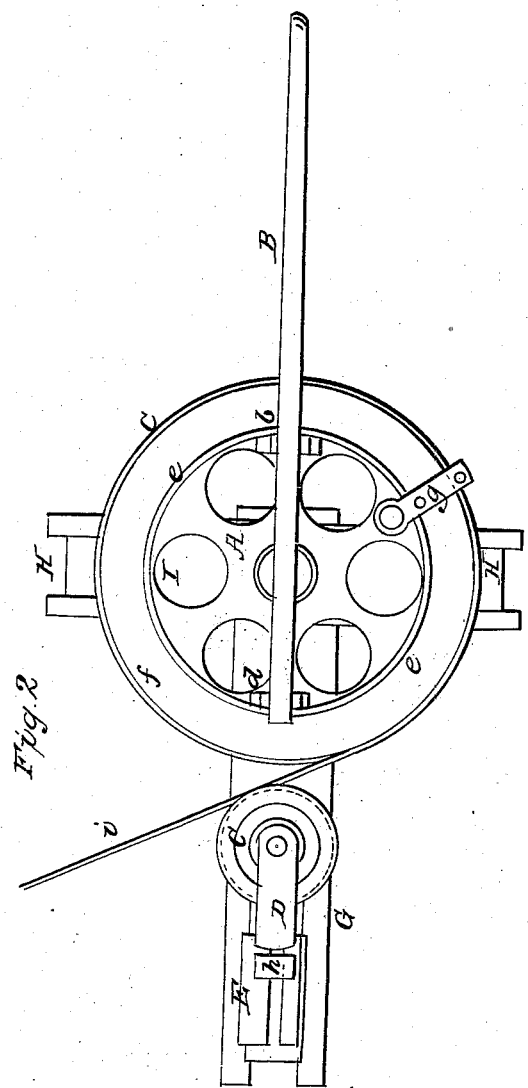
Witnesses:
W. C. Ashkettle
Wm. A. Morgan
Inventor:
R. Tyrrell
per Munn & Co.
Attorneys

United States Patent Office.

ROBERT TYRRELL, OF SUMNER, ILLINOIS.

Letters Patent No. 79,089, dated June 23, 1868.

IMPROVEMENT IN TIRE-BENDING MACHINE.

*The Schedule referred to in these Letters Patent and making part of the same.*

TO ALL WHOM IT MAY CONCERN:

Be it known that I, ROBERT TYRRELL, of Sumner, in the county of Lawrence, and State of Illinois, have invented a new and useful Improvement in Tire-Bending Machines; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2 is a top view of the same.

Similar letters of reference indicate like parts.

The object of this invention is to accomplish the bending of wagon-tire in an easy and expeditious manner.

It consists of a revolving disk, operated by a lever-arm, by means of which the tire is drawn between the periphery of the disk and a roller-wheel, and bent around the disk.

A is the disk, having the lever-arm B affixed across its top, by uprights $b$ $d$, cast on or affixed to the disk, and which are of sufficient height to pass the lever-arm clear of the jaw D, which furnishes the upper bearing of the shaft of the roller-wheel C.

Clamp-plates $g$ $g$ are affixed to the disk as shown, and provided with holes for the reception of the pin $p$, which clamps the end of the tire to the disk, as shown at fig. 2.

The disk is provided with two circular surfaces, $e$ and $f$, suitable for the fore and hind wheels of wagons, and the clamp-plates are provided with another and inner set of holes for the pin $p$, when the smaller circle, $e$, is being used.

The tire $i$ is drawn in between the disk and the roller-wheel, when the former is revolved in the manner shown at fig. 2, and one complete revolution of the disk accomplishes the formation of a wagon-tire from the bar. The disk is formed with a gudgeon, $k$, which fits within the step-bearing, $l$, and the latter passes through the frame or trestle-horse H H I G, and is affixed thereto as shown.

The bearings of the roller-wheel are in the jaw D and the plate $n$, the latter being formed with flange-plates $m$, to hold it upon the beam G.

The jaw D and plate $n$ are clamped to the beam G by means of a bolt-rod, $r$, having a head, $h$, and nut and washer, $j$. This bolt-rod passes down through the slotted extension, E, of the jaw, and similar slotted extension of the plate $n$, which lies immediately beneath.

By means of these slots the roller-wheel may be set up to the smaller circle, $e$, when the latter is being used or adjusted generally to each circle, to accommodate any thickness of bar-iron.

The block $o$, for the purpose of adjusting the height of the roller-wheel to either the larger or smaller circle of the disk. This block is slotted to permit the passage of the bolt-rod, and when used to raise the roller-wheel to its upper position, the block is withdrawn from its place, under the beam, and placed between the plate $n$ and the beam, the projection $q$ fitting into a corresponding hole in the beam, and the flanges $m$ fitting on the block as they did upon the beam.

The wheel is flanged, and in connection with the flange $c$ of the disk, prevents the tire from getting off from the bending-circle.

Having thus described my invention, I claim as new, and desire to secure by Letters Patent—

The combination of the rotary disk A, having the two diameters, $e f$, and provided with the lever B and clamping-device $g h$, with the horizontally and vertically-adjustable roller C, slotted arm D E, blocks $n$ $o$, headed rod $h$, provided with the nut $j$ and gudgeon $k$, all constructed and arranged to operate substantially as herein set forth.

ROBERT TYRRELL.

Witnesses:
HANSON SAXTON,
MARCELLUS SAXTON.